US 8,646,724 B2

(12) United States Patent
Bonnet et al.

(10) Patent No.: US 8,646,724 B2
(45) Date of Patent: Feb. 11, 2014

(54) SYSTEM FOR ATTACHING TWO COMPONENTS TOGETHER, SUCH AS AN AIRCRAFT ENGINE AND THE MOUNTING PYLON THEREOF

(75) Inventors: Mathieu Bonnet, Toulouse (FR); Eric Renaud, Brignemont (FR)

(73) Assignee: Airbus Operations (SAS), Toulouse Cedex (FR)

( * ) Notice: Subject to any disclaimer, the term of this patent is extended or adjusted under 35 U.S.C. 154(b) by 314 days.

(21) Appl. No.: 13/133,541

(22) PCT Filed: Dec. 2, 2009

(86) PCT No.: PCT/FR2009/052364
§ 371 (c)(1),
(2), (4) Date: Jun. 28, 2011

(87) PCT Pub. No.: WO2010/066985
PCT Pub. Date: Jun. 17, 2010

(65) Prior Publication Data
US 2011/0296676 A1  Dec. 8, 2011

(30) Foreign Application Priority Data
Dec. 8, 2008  (FR) ...................................... 08 06867

(51) Int. Cl.
*B64D 27/00* (2006.01)
(52) U.S. Cl.
USPC ........................ 244/54; 188/378; 267/140.11
(58) Field of Classification Search
USPC ............... 244/54; 248/554–557; 60/696–697; 267/136, 140.11
See application file for complete search history.

(56) References Cited

U.S. PATENT DOCUMENTS

| 4,044,973 A | | 8/1977 | Moorehead |
| 4,140,028 A | | 2/1979 | Desjardins |
| 4,381,043 A | * | 4/1983 | Fukushima .................... 180/300 |
| 4,405,101 A | * | 9/1983 | Carlson et al. ............. 244/17.27 |
| 4,458,861 A | * | 7/1984 | Mouille ...................... 244/17.27 |
| 4,619,349 A | * | 10/1986 | Braun ........................... 188/380 |

(Continued)

FOREIGN PATENT DOCUMENTS

DE          0311155         4/1989

OTHER PUBLICATIONS

European Patent Office, PCT/ISA/210 International Search Report, Mar. 11, 2010 (2 pgs.) (English Language version of Form PCT/ISA/210 (2 pgs)), Form PCT/ISA/237 Written Opinion of the International Search Authority (in English) (7 pgs.).

*Primary Examiner* — Tien Dinh
*Assistant Examiner* — Michael Kreiner
(74) *Attorney, Agent, or Firm* — Wood, Herron & Evans, LLP

(57) ABSTRACT

An attaching system for attaching two components together, such as an aircraft engine and a mounting pylon, includes front trunnions and rear trunnions for supporting the aircraft engine. In this attaching system, at least two of the front or rear trunnions are vibration damping type trunnions that include a suspension assembly with an elastic element and resonant mass. The suspension assembly is shaped as a bent arm carrying the resonant mass on a free end and associated with the elastic element on another end. The vibration damping type trunnions also include a shackle attached between the engine and the suspension assembly so that the vibration damping type trunnions minimize any vibrations and efforts that would otherwise be applied to aircraft structure via the pylon.

10 Claims, 3 Drawing Sheets

(56) References Cited

U.S. PATENT DOCUMENTS

| | | |
|---|---|---|
| 5,028,001 A | 7/1991 | Bender et al. |
| 5,551,650 A * | 9/1996 | Southward et al. ............ 244/54 |
| 5,775,638 A * | 7/1998 | Duesler ............................ 244/54 |
| 5,954,169 A * | 9/1999 | Jensen ............................. 188/378 |
| 6,009,985 A * | 1/2000 | Ivers ............................... 188/380 |
| 7,510,147 B2 * | 3/2009 | Haber ............................. 244/137.4 |

* cited by examiner

SYSTEM FOR ATTACHING TWO COMPONENTS TOGETHER, SUCH AS AN AIRCRAFT ENGINE AND THE MOUNTING PYLON THEREOF

CROSS-REFERENCE TO RELATED APPLICATIONS

This application claims priority, under Section 371 and/or as a continuation under Section 120, to PCT Application No. PCT/FR2009/052364, filed on Dec. 2, 2009, which claims priority to French Application No. 0806867, filed on Dec. 8, 2008.

TECHNICAL FIELD

The present invention relates to a system for attaching two components together, including an aircraft engine and an engine mounting pylon integral with the structure (wing or fuselage) of the aircraft, and with a view to treating, at least partially, even completely, the vibrational phenomena generated by the operation of the engines.

BACKGROUND

It is known that the junctions between the engine(s) and the mounting pylons are achieved by attaching systems of the front and rear trunnion type, inter alia arranged according to the longitudinal axis of the engine and contained in planes being perpendicular to said longitudinal axis.

In airliners provided with turbojets, the trunnions of the attaching systems are rigid, taking up stresses and torque issued from engines. In addition, with such trunnions, vibrations generated by the latter propagate up to the fuselage inside which the crew and passengers are located. However, thanks to the elasticity inherent to the wings, vibrations are essentially filtered, so that vibrations are hardly experienced by passengers and the crew and thus acceptable. Nevertheless, such vibrations exist and could cause a structural wear of some parts, be amplified mainly at particular frequency ranges, and become a nuisance for passengers and crew members.

If vibrational problems on turbojet airplanes are less obvious, although present, on the other hand, on airplanes provided with turbopropellers, the vibrations are amplified, in particular, at low frequencies, all the more as, in some airplanes designs, the turbopropellers are directly mounted in the wings.

In order to overcome such vibrational phenomena, the trunnions of attaching systems use elastomers so that the latter are less rigid but have a more significant damping than rigid trunnions, allowing for a partial filtration of vibrations, but nevertheless unsatisfactory at low frequency. Indeed, such "flexible" trunnions are submitted to high static loads, involving a high rigidity, in order to limit the movements and the "flutter" phenomena. A high rigidity directly results in a high resonance frequency (depending on the mass as well).

Dampers could also be provided on the attaching systems between the engine and the structure. However, the use thereof does not allow to act on the vibration modes, but to attenuate the effects thereof. In order to be efficient, a damper requires a minimum of movement speed. The current vibrations do not allow such a kind of implementation.

SUMMARY OF THE INVENTION

The present invention aims at overcoming such drawbacks and relates to a system for attaching two components together such as an aircraft engine to its mounting pylon. The design of the system allows to efficiently counteract the transmission of vibrations and efforts associated with the engine toward the structure of the aircraft, to filter the efforts issued from the engine whether of the turbopropeller, turbojet type or other, so as to reduce the vibrational levels toward the structure of the aircraft. This protects the structure of the aircraft and the comfort of passengers and crew members.

To this end, the system for attaching two components together, such as an aircraft engine and a mounting pylon of said engine integral with the structure of said aircraft, of the type comprising, in particular, front trunnions and rear trunnions with respect to the longitudinal axis X of said engine according to an orthonormal reference point XYZ, and contained in planes YZ perpendicular to said axis X, is remarkable according to the invention:

in that at least two of said front or rear trunnions are of the vibrational damping type;

in that said two trunnions are identical and arranged on either side of said pylon and said engine; and in that each vibrational damping trunnion comprises:

an elastic element-resonant mass suspension assembly, being connected to said pylon around a jointing axis parallel to the axis X and an end of which is free and bears said mass, whereas the other end is associated with said elastic element connected to said pylon; and at least one shackle having an end attached to said engine and the other end of which is connected to said corresponding suspension assembly.

Thus, thanks to this invention, the associated vibrations and efforts resulting from the operation of the engine and transmitted by the shackles to the suspension assemblies are taken up by the elastic elements, the deformation of which causes the suspension assemblies being rotated and the associated resonant masses located at the opposite of the elastic elements, being driven. At a defined excitation frequency, the mass assemblies, acting as resonators, become anti-resonant while counteracting the vibrational phenomena.

Consequently, as opposed to rigid systems allowing vibrations to be transmitted or to elastomer systems absorbing some vibrations, the system of this invention filters the efforts and all the vibrations generated by the integrated resonator suspension assemblies producing a frequency opposed to that of the elastic elements, while ensuring the attaching rigidity of the engine on the pylon.

According to a preferred embodiment, the two shackles of said trunnions are arranged approximately according to directions parallel to the axis Y and symetrically to the axis X and a third rigid trunnion is provided between said pylon and said engine and comprises a shackle jointed to them and arranged approximately according to a direction parallel to the axis Z.

Thus, the efforts according to Y and the torque around X are taken up by the shackles of the assemblies, whereas the efforts according to Z are taken up by the shackle of the third trunnion.

Preferably all said three trunnions are front trunnions of said engine on said pylon. However, all said three trunnions could be rear trunnions of said engine on said pylon.

Advantageously, each suspension assembly could have the shape of an arm being bent according to the periphery of said engine and bearing, at its ends, said elastic element and said resonant mass, whereas said jointing axis of said arm to said pylon is located in the vicinity of said elastic element. Thus, the mass is remote at most from the elastic element and at a defined excitation frequency, the arm and the mass of each assembly then form a substantial and efficient resonator becoming anti-resonant, thereby protecting the structure of the airplane from vibrations.

In order to increase the distance between the elastic element and the mass of each arm and to thereby limit the weight of the latter, the bent arm of each assembly could extend around said engine on about half of its periphery and tapers in the direction of its free end.

Furthermore, said jointing axes parallel between said assemblies and said pylon, said shackles and said engine, and said shackles and said assemblies are provided with flexible bearings made of an elastomer or similar. Such an arrangement does not create any friction between the different links so that the vibrations are able to be transmitted "freely" for being absorbed by the suspension assemblies of the attaching system.

In a preferred embodiment, said elastic element of each suspension assembly comprises at least one spring arranged on said pylon and on said assembly by respective supporting plates arranged laterally along said spring and integrating corresponding spiral portions of the latter.

As far as said resonant mass is concerned, it could have the shape of a mass roller mounted on an axis at the end of said free end of each assembly. The manufacturing simplicity and reliability of the elastic element and the resonant mass should be noticed.

Thus, taking into account the large diametral dimension of the engine and the arrangement of the shackles in directions Y for efforts to be taken up according to the latter, respective return small rods are provided, being jointed to said shackles and said suspension assemblies.

According to another feature of the attaching system, a third vibrational damping trunnion, identical to the two other trunnions, could be arranged between said pylon and said engine, so that all said three trunnions are distributed around said engine while being connected on the one hand to the latter and, on the other hand, to a circular cradle surrounding said engine and attached to said pylon.

Thus, the efforts according to the directions Y and Z and the torque around the direction X are taken up by the three trunnions that can be front and rear trunnions.

BRIEF DESCRIPTION OF THE DRAWINGS

The figures of the appended drawings will better explain how this invention can be implemented. In these figures, like reference numerals relate to like components.

DETAILED DESCRIPTION

Figure 1:
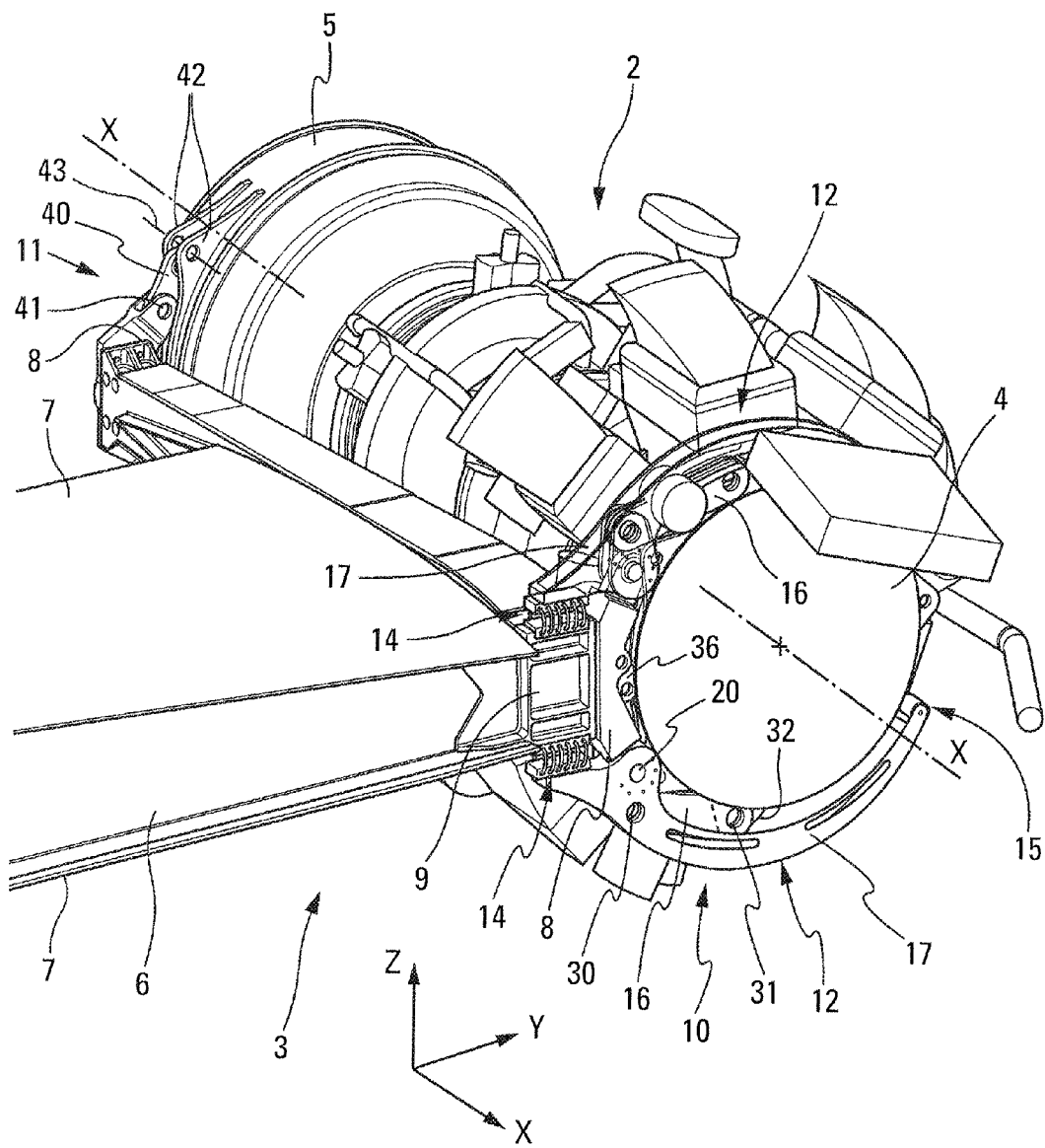
FIG. 1 shows a partial perspective view of an aircraft engine mounted on a mounting pylon via an attaching system according to this invention.

The attaching system 1 according to the invention, shown on FIGS. 1 to 5, provides the link between the engine 2 and the mounting pylon of an airplane. The engine 2 more particularly shown on FIG. 1 could be a turbo-propeller or a turbojet, the cylindrical bodies are in particular shown respectively the front one 4 of the compressor and the rear one 5 of the nozzle and being borne by the attaching system 1. The mounting pylon 3 is, in turn, integral with the structure, not shown, of the airplane.

Such a structure could be the wing or the fuselage of the airplane, and in the configuration as shown on FIG. 1, the mounting pylon 3 is arranged substantially in the horizontal plane XY of an orthonormal reference point XYZ corresponding to the rolling X, pitching Y and yawing Z axes of the airplane and is issued from the left rear side of the fuselage. Any other mounting pylon configuration with respect to the airplane is obviously possible.

The mounting pylon 3 includes a structural casing 6 covered with appropriate skins 7 and ending at the end with a rigid beam 8 parallel to axis X, with longeron spars and transversal ribs 9. On such a rigid beam 8, the engine 2 is mounted, with a longitudinal axis X via the attaching system 1

The attaching system 1 includes front trunnions 10 connecting the body 4 of the compressor of the engine 2 at the front of the beam 8 of the pylon 3 and contained in a plane YZ, rear trunnions 11 connecting the body of the nozzle at the rear of the beam 8 of the pylon and also contained in a plane YZ, and thrust connecting rods, not shown, connecting the engine to the pylon and substantially arranged in directions parallel to X.

Thus arranged, the front trunnions 10 of the attaching system 1 take up, as will be set forth later on, the efforts issued from the engine, according to the axes Y and Z as well as the torque around the axis X, the rear trunnions 11 also taking up the efforts according to the axes Y and Z, whereas the thrust connecting rods take up the efforts according to the axis X.

According to this invention and in this exemplary embodiment, two of the front trunnions 10 of the attaching system 1 are of the vibrational damping type. This means the front trunnions 10 aim, in addition to ensuring the attachment, at filtering the efforts transmitted by the operation of the engine 2 and at reducing the vibrational levels in the airplane. It can be seen, on FIGS. 1 to 3, that those two front trunnions 10 are identical and symmetrically arranged, in the plane YZ perpendicular to the axis X, respectively on either sides of the beam 8 of the pylon 3.

Structurally, each vibrational damping trunnion 10 includes a suspension assembly 12 connected to the pylon and having an elastic element 14 and a resonant beating mass 15, and a shackle or a connecting rod 16 arranged between the engine 2 and the suspension assembly 12. In particular, each suspension assembly 12 has the shape of a bent arm or branch 17, the extension of which substantially follows the outline of the engine 2 and being jointed, in the vicinity of a first end 18 thereof, to a side ear 19 of the beam 8 around an axis 20 parallel to the axis Z. Such a first end 18 is connected to the beam 8 by the elastic element 14, to be described later on, whereas the second end 21 of each arm 17 is free and bears the resonant mass 15.

Figure 2:
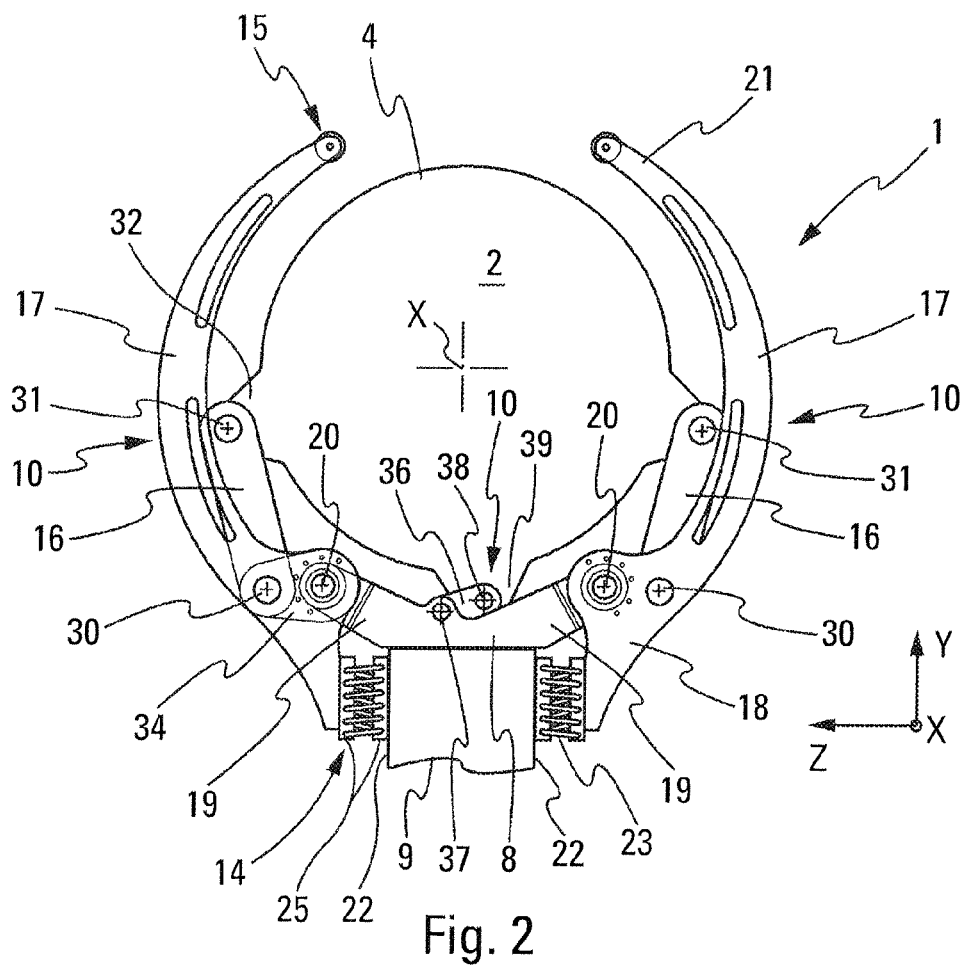
FIG. 2 is a front view of the attaching system on FIG. 1, associating the pylon with the engine.

It can be seen, more specifically, on FIGS. 1 and 2, that the two bent arms 17 extend from the side ears 19 of the pylon, symmetrically, around the periphery of the body 4 of the compressor on nearly the entirety of the body 4, and that the jointing axes 20 are close to the first ends 18 of the arms 17. The elastic elements 14, connecting the arms 17 to a transversal rib 9 associating the beam 8 with the casing 6 of the pylon are defined by helical springs 23, the lateral sides of the spires 24 of which are integrated into fixedly inserted supporting plates 25 and respectively on the first ends 18 of the arms and on the lateral sides 22 of the transversal rib 9, as shown on FIGS. 1 to 3. Such springs 23 provide taking up of the different efforts issued from the shackles 16 as will be set forth subsequently.

The second free ends 21 of the arms 17 bear, mass rollers 26 around axes 27. As each arm 17 surrounds nearly half of the external periphery of the engine 2, the length of the lever arm created between the joint 20 of the arm 17 to the beam 8 and the second free end 21 is large, so that the mass roller 26 can have a relatively low mass that does not excessively make heavy each suspension assembly 12. Such vibrating masses, as a result of the springs 23 being deformed, will become anti-resonant, opposing the springs 23.

Figure 3:
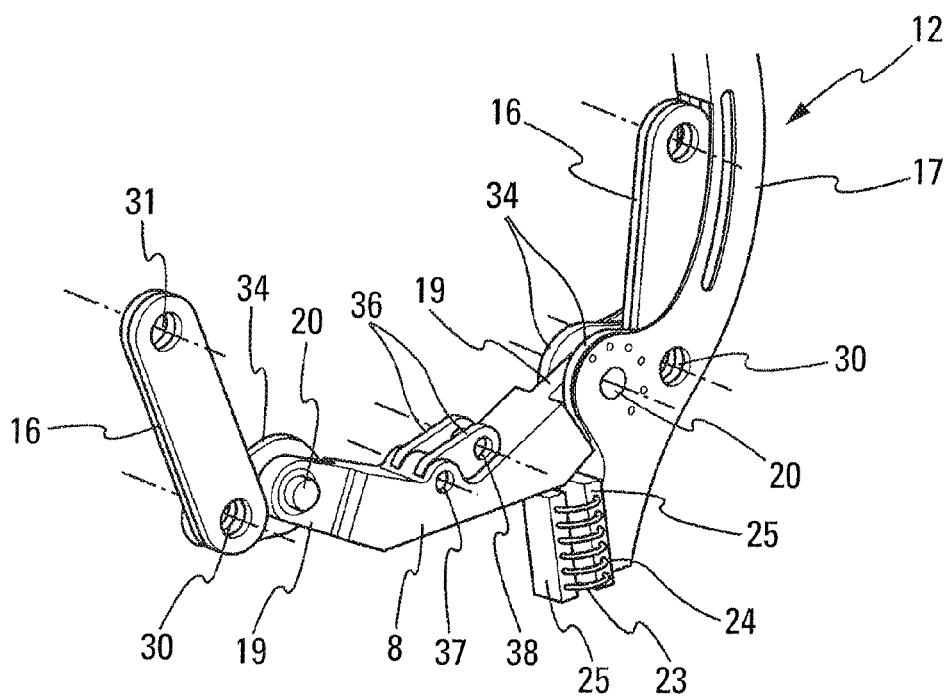
FIG. 3 is a partial perspective view of the attaching system shown on FIG. 2.
Figure 4:
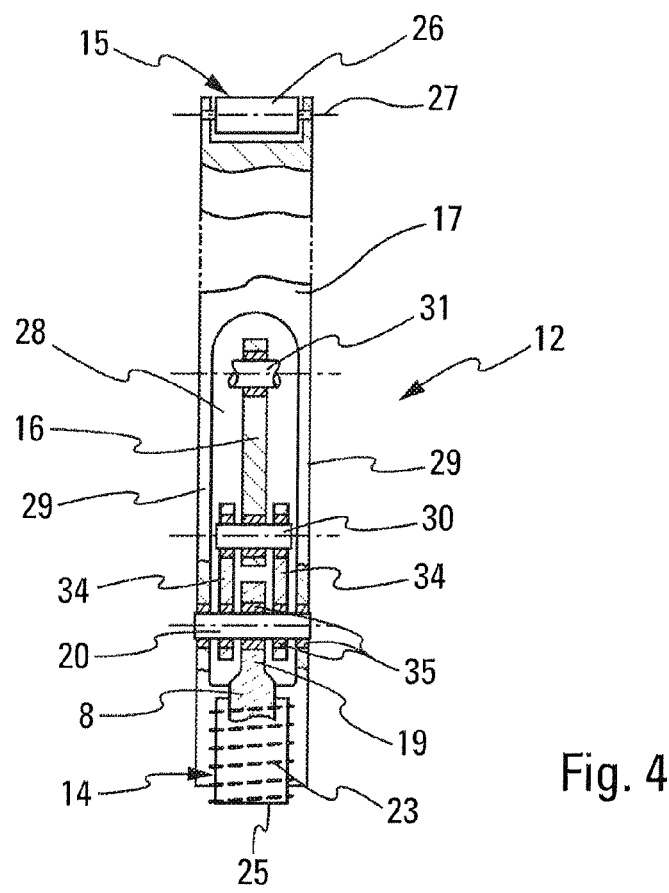
FIG. 4 is a sectional view of one of the trunnions crossing the jointing axes of the suspension assembly and the shackle of the trunnion.

FIGS. 3 and 4 also show that each arm 17 has, in a bottom part facing the engine 2 and close to the first end 18, a recessed portion 28 forming a U-shaped transversal section between the side wings 29 of which the corresponding side ear 19 engages around the jointing axis 20 of the arm 17 to the beam 8.

In this recess 28 of each arm 17, an end is provided of the shackle 16 connecting the engine 2 to the suspension assembly 12 and mounted around a jointing axis 30 parallel to X and, thus parallel, to the jointing axis 20. The other end of each shackle 16 is also jointed around an axis 31 to an anchoring tab 32 of the engine, the axis 31 being parallel to the other jointing axes 20 and 30. It should be further noticed that the position of the axes 30, 31 is such that the shackles 16 issued from the symmetrical anchoring tabs 32 of the engine 2 are substantially parallel to the axis Y of the reference point so as to take up, to the best, the efforts according to this axis. Because of such an arrangement inherent to the large size of the engines 2, there are provided, between the shackle 16 and the bent arm 17 of each suspension assembly, two identical return small rods 34 being arranged on either sides of the end of the shackle 16 around the axis 30 and on either sides of the side ear 19 around the jointing axis 20. The link between the return small rods 34 and the shackles 16 is free in rotation, whereas that between the return small rods 34 and the arms 17 is integral in rotation.

It should be noticed that, between the jointing axes 20, 30, 31 and the respective components such as the arms 17, the side ears 19, the shackles 16 and the small rods 34, elastomeric rings 35 are provided, avoiding frictions in the links (joints) so as to transmit the efforts and vibrations, so that they are taken up by the elastic spring-resonant mass suspension assemblies 12.

In order to take up the efforts according to the direction of the axis Z, the attaching system 1 comprises, as shown, more specifically on FIGS. 2 and 3, a third front trunnion 10 comprising two parallel and identical shackles 36 being arranged hingedly and rigidly around a single same axis 37 on the beam 8 of the pylon 3 and around a single same axis 38 on an anchoring tab 39 of the body 4 of the compressor, so that the general direction of the two shackles 36 is substantially in the axis Z of the reference point.

As far as the two rear trunnions 11 of the attaching system 1 are concerned, one of which is shown on FIG. 1, each one of them comprises a shackle 40 being mounted, at one of its ends, around an axis 41 and, at the other end, between two parallel fittings 42 of the body 5 of the nozzle via a jointing arm 43. FIG. 1 shows that this end of the shackle 40 is not yet integral with the fittings 42. The two thus mounted shackles 40 attach the rear of the engine 2 to the pylon 3 and take up, by virtue of the symmetrical mounting layout thereof with respect to the axis X, the efforts according to the directions of the axes Y and Z.

The attaching system 1 with, in this exemplary embodiment, two of the trunnions 10 thereof of the vibrational damping type, operates as follows.

During operation of the engine 2, during the flight of the airplane, the generated efforts are transmitted by the shackles 16 of the attaching system 1 to two symmetrical suspension assemblies 12 via small rods 34 connected, on one side, to the shackles around the axes 30 and, on the other side, to the bent arms 17 around the axes 20. Such arms 17 transmit the efforts to the springs 23 coming in abutment or tightening on the transversal rib 9 of the casing 6. Thus, the efforts coming from the shackles 16 are taken up and filtered by the springs 23. Also, their alternate deformation leads the bent arms 17 to be rotated around the axes 20, resulting in the mass rollers 26 being located in opposition to the springs 23, at the free ends 21 of the arms 17, to be driven.

At a defined excitation frequency, each bent arm 17 and its mass roller 26 become anti-resonant with respect to the associated spring 23, and thereby isolate the engine 2 from the pylon 3. The vibrations are thereby absorbed by the suspension assemblies 12 of the attaching system 1 and do not propagate to the structure of the airplane.

Figure 5:
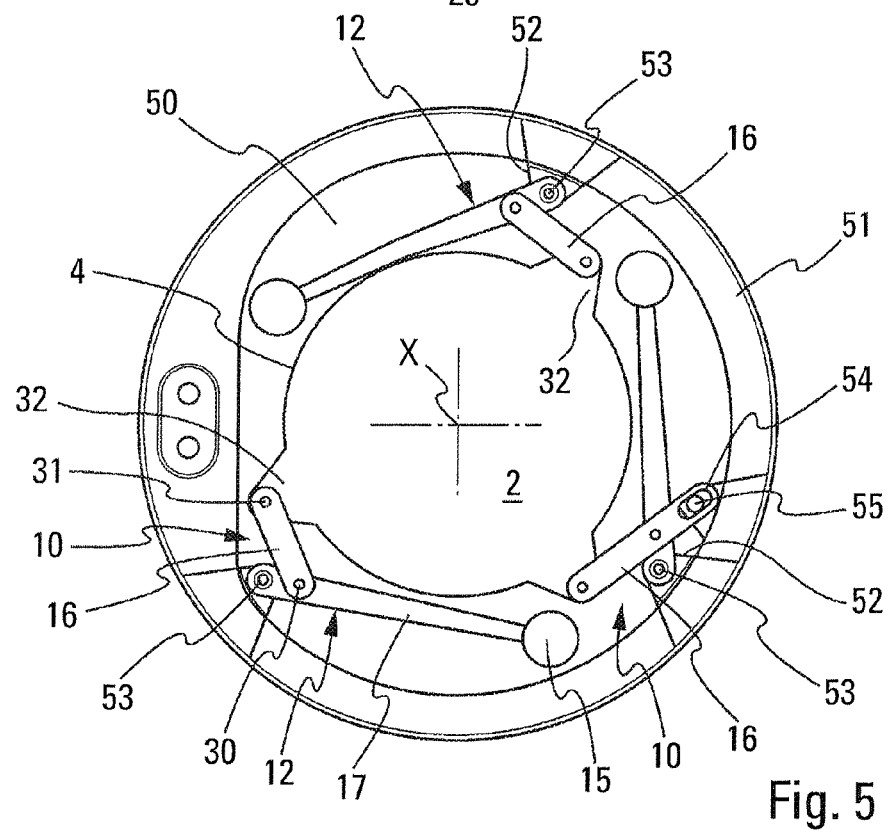
FIG. 5 shows another particular embodiment of the attaching system.

Another embodiment of the attaching system 1 according to this invention is schematically shown on FIG. 5. Instead of two vibrational damping trunnions, such a system comprises three front trunnions 10 being arranged in an annular space 50 provided between the body 4 of the compressor of the engine 2 and a supporting cylindrical cradle 51 coaxial to the axis X and integral with the mounting pylon 3 not shown on FIG. 5. Thereby, the three vibrational damping trunnions 10 not only take up the torque around the axis X and the efforts according to the axis Y, but also those according to the axis Z instead of the rigid shackles 36 of the previous embodiment.

In particular, each trunnion 10 comprises a shackle 16 being jointed, on the one hand, around an axis 31 to a attaching tab 32 of the body of the compressor, and on the other hand, to a substantially rectilinear arm 17 in this example, of the corresponding suspension assembly 12. Each arm 17, as in the previous embodiment, is furthermore connected, at one end, to an attaching tab 52 of the cradle 51 via the elastic element 14, that, in this embodiment, is a torsional tube 53 and bears, at the other free end, the resonant beating mass 15, being, in this embodiment, spherical.

This attaching system 1 respectively takes up and filters the efforts and vibrations issued from the engine 2 via shackles 16 directly (the small rods not being required in the present embodiment), deformable torsional tubes 53 and resonant spherical masses 15 of the mobile arms 17.

Furthermore, FIG. 5 shows that one of the shackles 16 of a trunnion extends, until it is jointed, via an oblong hole 54 around an axis 55 to an anchoring tab 52 of the cradle 51. Such an arrangement is a safety device allowing to limit the load transmitted by the engine on the anti-vibration system to 1 g, for instance.

Such a cradle system 51 could also be integrated at the level of the rear trunnions 11.

Furthermore, the torsional tubes 53 could be replaced by bending blades without departing from the scope of this invention. For instance, each blade is connected at its ends to anchoring tabs of the cradle 51 and comprises on the latter a free beating mass elongated element, counteracting the vibrations generated by the blade jointed to the corresponding shackle issued from the engine. This embodiment of the disclosed system with torsional tube or bending blade elastic elements could integrate instead that previously described with spring elastic elements.

The invention claimed is:

1. A system for attaching two components together, the two components including an engine of an aircraft and a mounting pylon of the engine that is integral with structure of the aircraft, the system comprising:

front trunnions and rear trunnions positioned with respect to a longitudinal axis X of the engine and according to an orthonormal reference point XYZ, the front and rear trunnions being contained in planes YZ perpendicular to the longitudinal axis X, wherein at least two of the front trunnions or the rear trunnions are vibrational damping trunnions;

wherein the at least two vibrational damping trunnions are identical to each other and are arranged on opposing sides of the pylon and the engine; and wherein each of the at least two vibrational damping trunnions further comprises:

a suspension assembly defining an arm with first and second ends, the arm being rotatably connected to the pylon around a jointing axis parallel to the longitudinal axis X;

a resonant mass coupled to and supported by the first end of the arm, which is free from connection to the pylon;

an elastic element connecting the second end of the arm and the pylon; and at least one shackle having one end attached to the engine and another end attached to the arm of the suspension assembly, wherein the arm of the suspension assembly has a bent shape which surrounds a portion of the external periphery of the engine, such that the first end and resonant mass are free to rotate about the jointing axis in order to dampen vibrations between the engine and the mounting pylon.

2. The attaching system according to claim 1, wherein the at least one shackle of each of the vibrational damping trunnions is arranged approximately parallel to an axis Y of the planes YZ and symmetrical with respect to the longitudinal axis X, and the system further comprises:

a third rigid trunnion provided between the pylon and the engine and including a shackle jointed to the engine and approximately arranged parallel to an axis Z of the planes YZ.

3. The attaching system according to claim 2, wherein each of the vibrational damping trunnions and the third rigid trunnion are front trunnions of the engine on the pylon.

4. The attaching system according to claim 2, wherein each of the vibrational damping trunnions and the third rigid trunnion are rear trunnions of the engine on the pylon.

5. The attaching system according to claim 1, wherein the jointing axis of the arm of the suspension assembly is positioned proximate to the elastic element.

6. The attaching system according to claim 1, wherein each jointing between the suspension assemblies and the pylon, between the shackles and the engine, and between the shackles and the suspension assemblies is provided with a flexible bearing made of an elastomeric material.

7. The attaching system according to claim 1, wherein the elastic element of each vibrational damping trunnion includes a spring arranged on the pylon and on the suspension assembly by respective supporting plates arranged laterally along the spring and integrating corresponding spire portions of the spring.

8. The attaching system according to claim 1, wherein the resonant mass has the shape of a mass roller mounted on an axis at the end of said free end of each assembly.

9. The attaching system according to claim 1, further comprising:

return small rods, each of which is located between and jointed to the shackle and the suspension assembly of one of the vibrational damping trunnions.

10. The attaching system according to claim 1, further comprising:

a third vibrational damping trunnion identical to each of the at least two vibrational damping trunnions and located between the pylon and the engine so that at least three vibrational damping trunnions are distributed around the engine and are connected to the engine and to a circular cradle surrounding the engine and attached to the pylon.

* * * * *